United States Patent [19]
Pogson

[11] 3,724,522
[45] Apr. 3, 1973

[54] CONSTANT VELOCITY UNIFORM FLOW EVAPORATOR HEADER

[75] Inventor: John T. Pogson, Seattle, Wash.

[73] Assignee: The Boeing Company, Seattle, Wash.

[22] Filed: May 10, 1971

[21] Appl. No.: 141,891

[52] U.S. Cl. ............159/13 B, 137/561 A, 202/236, 203/89, 165/115, 159/28 P
[51] Int. Cl. .........B01d 1/22, B01d 3/00, A23c 3/04, E03b, B01d 3/08
[58] Field of Search ........159/13 B, 27 R, 28 VH, 24, 159/14, 43, 13; 261/97, 112; 122/39, 406; 137/561 A; 165/115, 117; 202/236; 203/89; 62/347

[56] References Cited

UNITED STATES PATENTS

| | | | |
|---|---|---|---|
| 2,343,886 | 3/1944 | Cornell, Jr. | 159/3 X |
| 3,351,119 | 11/1967 | Rosenblad | 159/13 B |
| 3,366,158 | 1/1968 | Rosenblad | 159/13 B |
| 3,371,709 | 3/1968 | Rosenblad | 159/13 B X |
| 3,616,835 | 11/1971 | Laurenty | 159/13 B |

Primary Examiner—Norman Yudkoff
Assistant Examiner—J. Sofer
Attorney—Glenn Orlob, Kenneth M. MacIntosh and Kenneth W. Thomas

[57] ABSTRACT

An overflow evaporator header providing equal volumetric flow from an upper overflow edge including a generally horizontal longitudinally extending header duct for placement on top of a falling film evaporator panel with said header duct having a first inlet end, a second end, and having a varying transverse cross sectional flow area decreasing from the first end to the second end to provide constant velocity of fluid flow therethrough. A fluid exit port having an open ended cellular structure positioned on top of the header duct and in fluid communication therewith allows the fluid to flow upwardly and out onto an upper overflow surface. The passageways of the fluid exit port can be varied in length, height above a reference datum, or in cross sectional area to compensate for fluid flow frictional pressure losses and fluid flow turning losses experienced by the fluid in flowing down the length of the header duct and upward into the passageways thus providing equal volumetric flow of fluid from each passageway onto the upper overflow surface. Flow director vane structures may be positioned near the inlet end of the header duct to direct the fluid generally longitudinally into the header duct and outlet means may be provided at the second end of the header duct to provide for the discharge of solids contained in the fluid that would otherwise accumulate therein.

15 Claims, 4 Drawing Figures

JOHN T. POGSON
BY
Kenneth M. MacIntosh
ATTORNEY

INVENTOR,
JOHN T. POGSON
BY
ATTORNEY

CONSTANT VELOCITY UNIFORM FLOW EVAPORATOR HEADER

BACKGROUND OF THE INVENTION

This invention relates to overflow evaporator headers of the type used in conjunction with vertically oriented evaporator panels employing a falling film of fluid downwardly over the exterior walls of said evaporator panels. The increasing demands being placed upon water resources, the supply of which in certain geographical areas has begun increasingly critical, has led to considerable effort being spent upon means for purifying saline waters to provide fresh water for industrial and domestic consumption as well as means for purifying water and other solutions used in industrial processes before such solutions are discharged into the environment. Because these systems are designed to operate with respect to large volumes of fluids, it is important that the apparatus be capable of high flow rates, be of minimum complexity, economical to fabricate, and capable of operation over extended periods of time without excessive maintenance.

To meet these goals, the falling film evaporator has been shown to have considerable merit. In the falling film evaporator, a thin film of the fluid to be evaporated and consequently purified is caused to flow downwardly over the exterior surfaces of evaporator panels which are heated to cause evaporation of the fluid along the vertical length of the panel. In order for an apparatus of this design to be successful, it is important that the flow distribution of the fluid downward over the exterior surfaces of the evaporator panels be of uniform distribution in order to provide for uniformity of heat transfer across the panel and to prevent the possibility of chemical scaling due to local dry regions along the vertical exterior panel surfaces. Previous attempts to control the uniformity of fluid flow distribution across these panel surfaces have not been generally successful primarily because the total hydraulic head of the fluid at the top of the overflow header was not carefully controlled.

SUMMARY OF THE INVENTION

It is therefore an object of this invention to provide an overflow evaporator header that produces a uniform distribution of fluid flow over an expansive area.

It is another object of this invention to provide a constant velocity uniform flow evaporator header having means to compensate for fluid flow losses therein to assure the fluid will exhibit a uniform total hydraulic pressure head at the overflow surface.

It is a further object of this invention to provide a uniform volumetric flow evaporator header of efficient economical design applicable to high volume, large scale falling film desalinization systems.

These and other objects of this invention are met by the apparatus of this invention wherein there is provided a longitudinally extending header duct means adapted for the flow of fluid therethrough, said header means having a decreasing transverse cross sectional fluid flow area from a first end to a second end. The fluid is introduced into the header duct by an inlet means positioned at the first end of the duct with said inlet means having flow director devices to direct the fluid admitted into the duct longitudinally therethrough. The upper portion of the header duct is in fluid flow communication with a fluid exit port means carried thereby which comprises a plurality of upwardly extending passageways for the flow of fluid upwardly onto an upper overflow surface of the fluid exit port means. The decrease in the transverse cross sectional flow area of the header duct is proportional to the volume of upward outflow of fluid cumulatively along the length of the header duct to assure essentially uniform average fluid flow velocity longitudinally through the header duct. To compensate for frictional pressure losses and momentum losses of the fluid flowing through the header duct and into said passageways, the geometry of the fluid exit port means and the passageways is modified to assure a uniform total hydraulic head at the upper surface of the fluid exit port means. In particular, the passageways may be varied in length, height above a reference datum, and cross sectional area to provide uniform equal volumetric flow of the fluid from the plurality of passageways at the upper overflow surface of the fluid exit port means.

DESCRIPTION OF THE PREFERRED EMBODIMENTS

In order to describe the operation of the overall desalinization system and to understand the reasons for the specific construction of the presently disclosed unique overflow header, a short explanation of the complete desalinization system is desirable for introduction.

Figure 1:
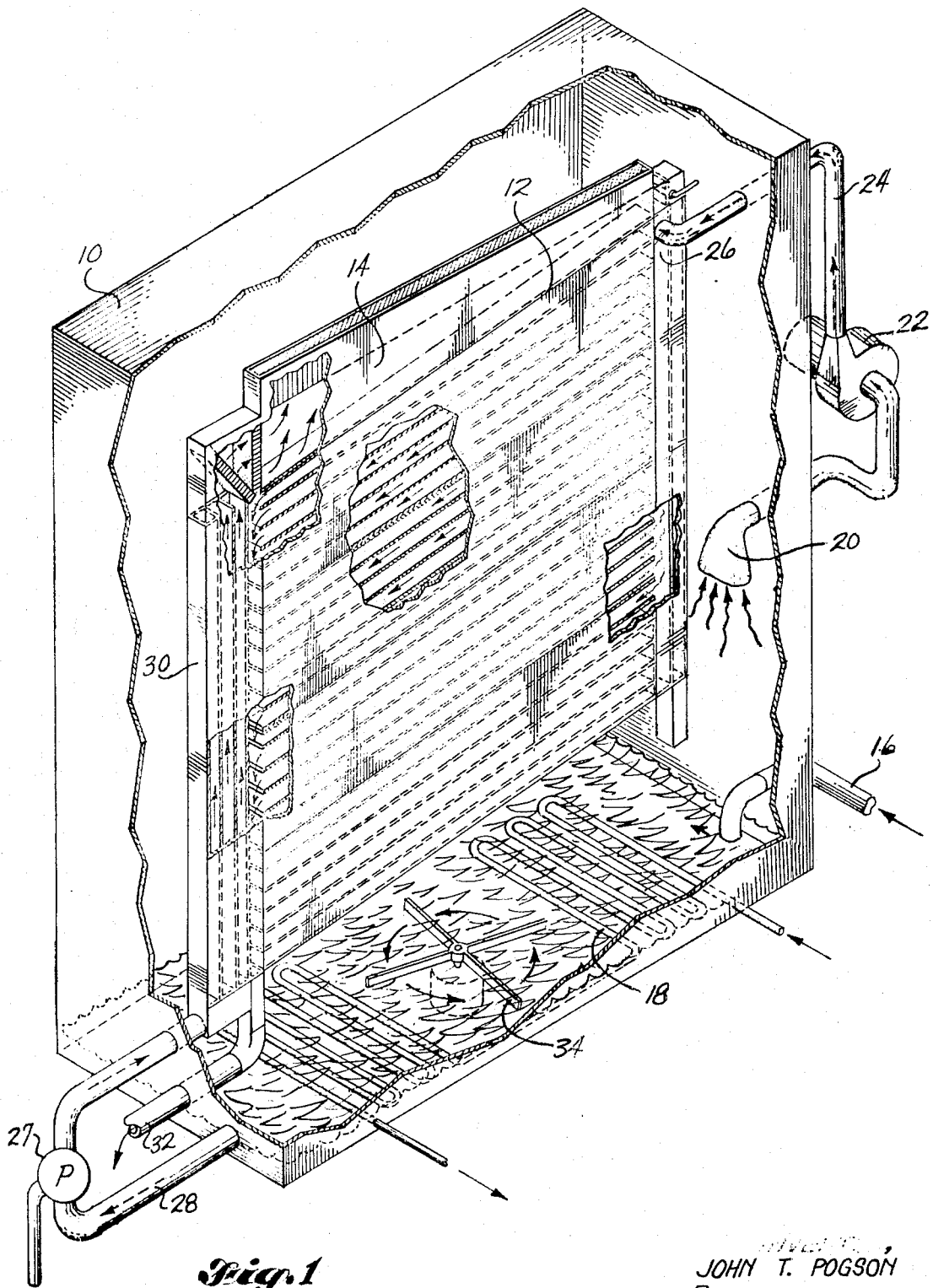
FIG. 1 is an isometric view, partially in section, of a desalinization apparatus embodying the uniform flow evaporator header of this invention.

Referring specifically to FIG. 1, the desalinization system is seen to comprise tank 10 containing therein vertically oriented falling film evaporator panel 12 with overflow header 14 mounted on the top thereof. Sea water, or other brine solution to be purified, at an elevated temperature near the boiling point thereof is drawn into tank 10 through input pipe 16. A trimmer heater means 18 compensates for any heat loss and maintains the temperature of the brine solution just below the boiling point. Steam present in tank 10 above the brine solution and generated in a manner to be described below is drawn upwardly through steam outlet pipe 20 by steam compressor 22 which raises the temperature of the steam and directs it through steam conduit 24 to input channel 26 of evaporator panel 12. The internal arrangement of evaporator panel 12 is so designed that a nearly equal steam pressure and temperature is maintained throughout the entire panel. Simultaneously, brine pump 27 drains the brine solution from the bottom of tank 10 through pipe 28 and directs the solution through input conduit 30 to overflow header 14 which is specifically constructed according to the teachings of this invention to discharge the brine solution in uniform volumetric flow per unit area out of the upper surface of overflow header 14 so that a film of brine solution is evenly distributed and flows downwardly over the vertical exterior surfaces of evaporator panel 12. This falling film of brine solution is further heated by the high temperature steam within evaporator panel 12 and boils off producing steam which is drawn off by steam compressor 22. Similarly, the steam within evaporator panel 12 is cooled by the falling brine film, condensed to purified water, and collected at the bottom of evaporator panel 12 through distillate output pipe 32.

In order that the sodium chloride or other salts in the brine will not settle out in tank 10, stirring means 34 are provided at the tank bottom interior.

Figure 2:
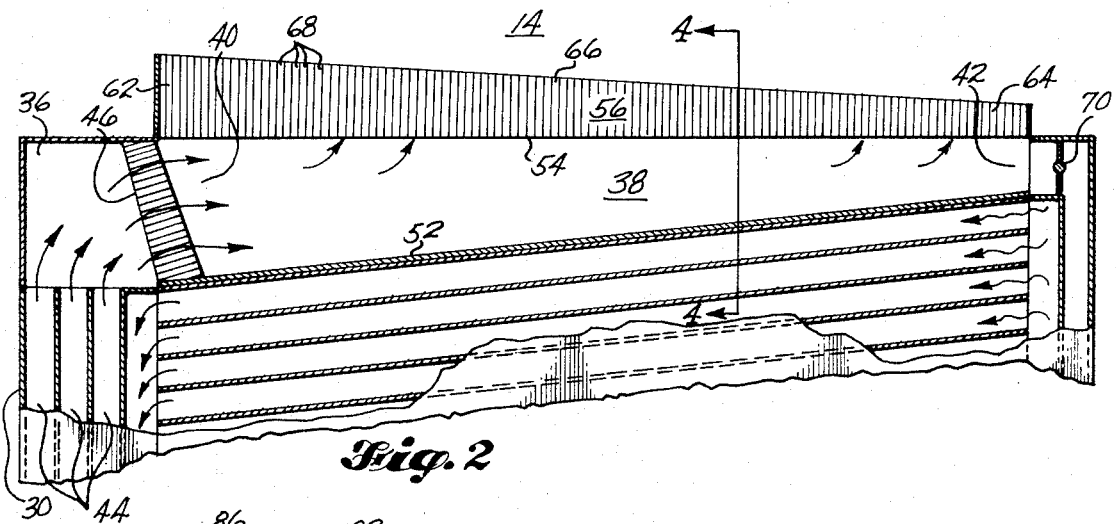
FIG. 2 is a detailed elevational view, primarily in section, of the evaporator header portion of the system of FIG. 1.
Figure 3:
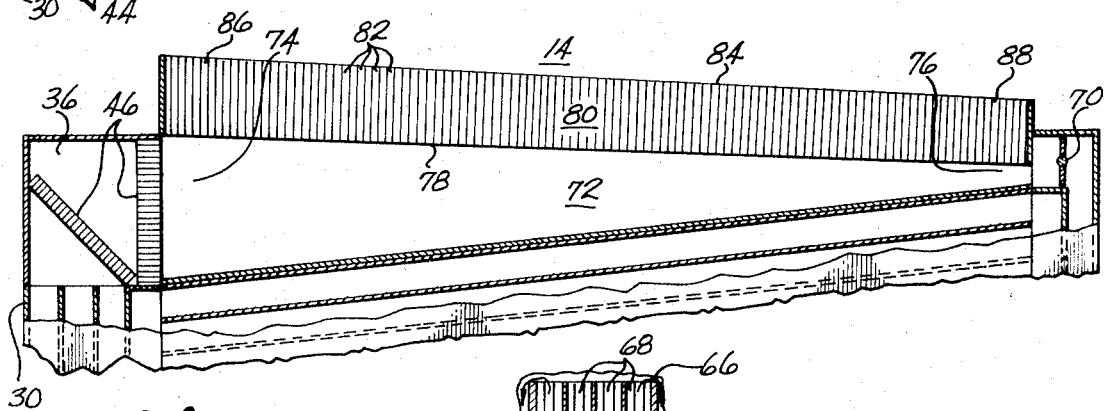
FIG. 3 is a detailed elevational view, primarily in section of an alternate configuration of the evaporator header of FIG. 2.
Figure 4:
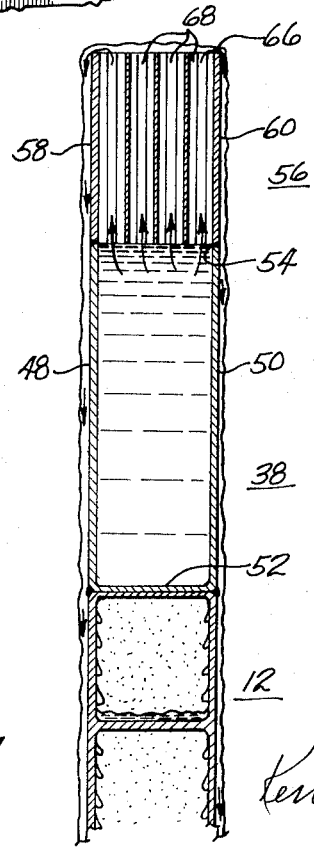
FIG. 4 is a transverse cross sectional view taken along lines 3—3 of FIG. 2.

Referring now to FIGS. 2 – 4 wherein there is shown specific details of overflow header 14, the sea water or brine fluid is raised via input conduit 30 to upper chamber 36 and then directed into header duct 38 mounted on top of evaporator panel assembly 12. Header duct 38 has a first end 40 and a second end 42 with the fluid being admitted thereto at first end 40. Any type of conduit means may be used for input conduit 30 but in this embodiment it has been found convenient to use an extruded section having a multiplicity of flow input channels 44 interiorly of the extrusion. The fluid flows out of these extrusion input channels 44 into upper chamber 36 wherein there are located flow director means 46 whose purpose is to redirect the flow of the fluid from the vertical direction traveled in input channels 44 to a generally horizontal or longitudinal direction for flow through header duct 38. The structure of flow director means 46 is not particularly critical and it has been convenient to dispose within upper chamber 36 one or more honeycomb or other open cellular panels at an angle to have the effect of turning the fluid flow from the vertical to the generally horizontal or longitudinal direction. While it is possible to conduct the fluid directly into header duct 38 without the use of flow director means, the operation of the evaporator header is considerably improved by using such directors as they minimize turbulence and boundary effects that would otherwise be present at the input or first end 40 of header duct 38. Furthermore, it is not always necessary that flow directors 46 direct the fluid flow absolutely horizontally into header duct 38 for in certain cases it may be desirable to direct the fluid flow at a point at the upper surface of header duct 38 intermediate first end 40 and second 42 thereof.

As used herein, the term "longitudinal" with reference to the direction of fluid flow into header duct 38 includes such variations, for the only controlling limitation is that the fluid flow be in a direction from first end 40 to second end 42 of header duct 38.

In certain configurations of the evaporator apparatus using the herein described invention, input conduit 30 may be oriented horizontally at first end 40 of header duct 38 in which case flow director means 46 may be simplified as it would then not be necessary to provide for smoothly diverting the fluid flow from a vertical direction to a direction longitudinal to header duct 38.

Header duct 38 is comprised of two vertical side walls 48, 50 that are spaced apart in parallel relationship to be in alignment with the exterior vertical wall surfaces of evaporator panel 12 on which the header duct is mounted with lower wall 52 of header duct 38 engaging the top edge of the evaporator panel 12. Header duct 38 has an open upper edge portion 54 upon which there is carried fluid exit port 56 which is seen to be a generally longitudinal structure of approximately the same length as header duct 38 having vertical parallel spaced apart sidewalls 58, 60 that are in alignment with the vertical spaced apart sidewalls 48, 50 of header duct 38 so that a continuous smooth vertical exterior surface is formed along all three elements: the evaporator panel, header duct, and fluid exit port. Fluid exit port 56 also has a first end 62 and a second end 64 corresponding to the first and second ends of header duct 38, and an upper overflow surface 66. Interiorly of fluid exit port 56 there are a plurality of upwardly extending passageways 68 that are open ended for the flow of the fluid upwardly from header duct 38 through fluid exit port 56 and then across the upper overflow surface 66 and down along the exterior vertical surfaces of fluid exit port 56 header duct 38 and evaporator panel 12 in the manner above described.

Upwardly extending passageways 68 of fluid exit port 56 may be formed in any one of a number of ways such as by casting, drilling, or otherwise forming a plurality of orifices or channels through the thickness of fluid exit port 56. Alternatively, it has been found convenient in the practice of this invention to place interiorly of fluid exit port 56 an open cellular structure having relatively thin sidewalls forming generally regular cross sectional area passageways extending entirely through fluid exit port 56. Many different types of open cellular structure may be used for this purpose such as egg crate structures, grill devices of a similar type, or other types of honeycomb structures having passageways extending therethrough.

If the fluid flowing through the evaporator header of this invention has a high solid content such as a concentrated brine solution, it may be desirable to provide fluid outlet 70 at second end 42 of header duct 38. In this manner, the velocity of the fluid in the boundary layer adjacent the interior surface of lower wall 52 at second end 42 of header duct 38 is maintained thus preventing fluid stagnation in this region and the consequent settling out of salts and other solid materials within header duct 38. The solids can be discharged through fluid outlet 70 either back into tank 10 or without the evaporation system entirely as a waste discharge. In other cases, where the solid content of the fluid is not high and accumulation of solids in header duct 38 is not troublesome, outlet means 70 may be eliminated.

It should be noted that with passageways 68 oriented approximately normal to the direction of fluid flow longitudinally through header duct 38 certain flow conditions are created in header duct 38 as the fluid flows into passageway 68 of fluid exit port 56 that provide a scouring action at the lower wall 52 of header duct 38 thus tending to prevent the settling out of solids in header duct 38 and consequent choking off of the fluid flow therein.

The principal advantages of this invention are provided by maintaining a constant velocity flow of the fluid within header duct 38 in conjunction with controlling the total hydraulic head at upper overflow surface 66 of fluid exit port 56 to achieve an equality of pressure across essentially the entire upper overflow surface. Several factors are involved in obtaining these flow conditions. As the fluid flows longitudinally from the first end 40 of header duct 38 to the second end 42 thereof, there is a cumulative vertical upward outflow of fluid through passageways 68 of fluid exit port 56 along the longitudinal length of the header. To assure constant uniform average fluid flow velocity down the length of header duct 38, it is necessary to vary the transverse cross sectional flow area of header duct 38 in a decreasing manner from first end 40 to second end 42. This decrease in transverse cross sectional flow area through header duct 38 is controlled in a manner to be proportional to the cumulative upward outflow of fluid along the length of header duct 38.

In order to assure essentially uniform volumetric flow of the fluid out of the plurality of passageways 68 at the upper overflow surface 66 of fluid exit port means 56, accommodation or compensation must be made for certain flow losses inherently occurring along the length of header duct 38. This is accomplished by taking into consideration and by controlling the total fluid hydraulic pressure or head of the fluid flowing through the system. Analysis has shown that the total fluid hydraulic head is made up of and is dependent upon several factors as follows:

1. the static pressure of the fluid flowing through header duct 38 and passageways 68;
2. the velocity head of this fluid;
3. the frictional pressure losses occurring as the fluid flows the length of header duct 38 and passageways 68;
4. the height differences or potential head of the fluid flowing out of passageways 68 at the upper overflow surface 66 of fluid exit port 56 with reference to a selected datum; and
5. momentum or turning losses attributable to the change in flow direction of the fluid from the generally longitudinal direction through header duct 38 through essentially 90° to the upward outflow direction through passageways 68 in fluid exit port 56.

Control over these factors is provided by the unique features of this invention. By properly sizing the flow area longitudinally along header duct 38 as described above, the velocity head of the fluid flowing through the header duct is maintained constant. Since the momentum or turning losses experienced by the fluid flowing from header duct 38 up through passageways 68 in exit port means 56 is primarily dependent upon the velocity of the fluid, equalizing the velocity head also tends to equalize these momentum or turning losses along the length of header duct 38.

The static pressure of the fluid flowing through header duct 38 will vary along the length of the duct from first end 40 to second end 42 due to the frictional pressure losses experienced by the fluid along the interior walls of header duct 38.

This variation in total head of the fluid can be controlled in at least three different ways, separately or in combination. Referring to FIG. 2, it can be seen that the upper edge portion 54 of header duct 38 is essentially horizontally thus providing a constant uniform potential head along that plane. However, it is also seen that the thickness or height of fluid exit port 56 varies from first end 62 to the second end 64 thereof in that upper overflow surface 66 decreases in height from the first end to the second end. This arrangement provides two methods for effecting control over the total hydraulic head of the fluid as it exits from the plurality of passageways 68 at upper overflow surface 66. In particular, those passageways near first end 62 of fluid exit port 56 are of greater length than those passageways 68 further along the length of fluid exit port 56 toward second end 64. Thus there will be greater frictional losses occurring in the longer passageways than there will be in the shorter passageways further along the length of fluid exit port 56. In addition, since the longer passageways near first end 62 rise to a higher height or elevation above a reference datum, the fluid flowing therethrough will acquire a higher potential head than that fluid flowing through the shorter and less elevated passageways 68 near second end 64 of fluid exit port 56. In this manner, the frictional pressure losses occurring in the passageways and the potential head acquired by the fluid flowing through the passageways can be controlled to offset the frictional pressure losses experienced by the fluid flowing down the length of header duct 38 in a manner such that the total hydraulic head of the fluid flowing from all of the passageways 68 at upper overflow surface 66 can be maintained uniform. This uniformity of total hydraulic pressure head of the fluid flowing across overflow surface 66 will ensure that the fluid will be evenly distributed in a film of uniform thickness across the entire vertical exterior surfaces of evaporator panel 12 and thus contribute significantly to the economy and overall efficiency of the operation of the evaporator apparatus.

Within the teachings of this invention, other methods are contemplated to control the total hydraulic head of the fluid flowing out of passageways at the upper overflow surface of the fluid exit port. In particular, there is shown in FIG. 3 an arrangement of header duct 72 having a first end 74 and a second end 76 generally similar to header duct 38 of FIG. 2. In FIG. 3, the transverse cross sectional flow area of header duct 72 also decreases from the first end to the second end in a manner such that the fluid flow velocity longitudinally through header duct 72 is uniform along the length thereof. However, unlike the arrangement of FIG. 2, in the embodiment of FIG. 3 open upper edge portion 78 of header duct 72 is not in a horizontal plane but is seen to slope downwardly from first end 74 to second end 76. Also, unlike the embodiment of FIG. 2, fluid exit port 80 of FIG. 3 is not of decreasing thickness from first end 86 to second end 88 thereof, but rather is of uniform thickness over this length. In this manner, the total hydraulic head of the fluid flowing from the plurality of passageways 82 is maintained uniform by controlling the potential head of the fluid only, inasmuch as the frictional pressure losses of the fluid flowing through passageways 82 are uniform since the length of these passageways remains constant. This embodiment has particular advantage in that it is not necessary to separately machine the thickness of fluid exit port 80 to a decreasing contour from first end 86 to second end 88. This embodiment has advantageous application in those header assemblies that are of relatively short length from first end 74 to second end 76 wherein the frictional pressure losses of the fluid flowing through such a short header duct are relatively low and can be readily accommodated by relatively small differences in the height of upper overflow surface 84. In evaporator headers of greater length the frictional pressure losses of the fluid flowing therethrough will be considerably greater along the length of the header duct and it is then normally more convenient to compensate for these losses by altering not only the potential head of the fluid flowing out of passageways at the upper overflow surface by sloping this surface, but also by providing additional compensation by varying the length of the passageways. In this manner, there will be assured a constant uniform volumetric flow of fluid from each passageway along the length of the upper overflow surface of the fluid exit port.

It is thus seen that the total hydraulic pressure head of the fluid flowing from the plurality of passageways onto the upper overflow surface of the fluid exit port can be controlled by several combinations of adjustments to the length of passageways as well as their extension above a reference datum. In addition, the flow characteristics of the fluid flowing through the passageways can be varied along the length of the fluid exit port by varying the size or cross sectional area of the passageways between the first end and the second end. Thus, if lessening resistance to flow is to be introduced towards the second end of the fluid exit port the cross sectional area of the passageways towards that end can be made increasingly larger. This technique may be used either separately or in combination with variations in the length of the passageways or the vertical extension of the passageways above a reference datum.

While it is generally desirable to maintain the direction of the passageways in the fluid exit port in a vertical orientation, in certain applications it may be preferable to slant these passageways to a certain degree from the vertical. Thus certain vortex effects of the flow of fluid near the inlet of the first end of the header duct may be compensated by adjusting the slope of the normally vertical passageways in order to assure constant and uniform volumetric flow of the fluid out of the passageways at the upper overflow surface.

Various other modifications of the apparatus of this invention are contemplated and may obviously be resorted to by those skilled in the art without departing from the spirit and scope of the invention as hereinafter defined by the appended claims.

I claim:

1. A uniform upward flow discharge header apparatus comprising:
   a. A generally horizontal, longitudinally extending header duct means having an upper portion, a first end and a second end; said header duct means decreasing in transverse cross sectional area from said first end to said second end;
   b. inlet means communicating with said header duct means at said first end for admitting the flow of fluid longitudinally into said header duct means; and
   c. a generally horizontal, longitudinally extending fluid exit port means having a lower portion and an upper surface portion, said lower portion in coextensive communication with the upper portion of said header duct means for the upward outflow of fluid from said header duct means through said fluid exit port means; said header duct means and said fluid exit port means cooperatively adapted to provide essentially uniform volumetric flow per unit area from the upper surface portion of said fluid exit port means.

2. The apparatus as claimed in claim 1 further including outlet means in the second end of said header duct means for the discharge of excess fluid flow from said header duct means.

3. The apparatus as claimed in claim 1 wherein said inlet means includes flow director means for longitudinally orienting the flow of fluid admitted into said header duct means.

4. The apparatus as claimed in claim 1 wherein the decrease in the transverse cross sectional area of the header duct means from the first end to the second end is proportional to the volume of upward outflow of fluid cumulatively along the length of said header duct means to provide essentially uniform average fluid flow velocity longitudinally through said header duct means.

5. The apparatus as claimed in claim 4 wherein said fluid exit port means comprises means defining a plurality of upwardly extending, open ended passageways extending from the lower portion to the upper surface portion of said fluid exit port means for the flow of fluid therethrough from said header duct means.

6. The apparatus as claimed in claim 5 wherein said means defining a plurality of open-ended passageways comprises an open-ended cellular structure.

7. The apparatus as claimed in claim 5 wherein the upward extension of said passageways in said fluid exit port means is inversely proportional to the combined pressure losses of the fluid flowing through said header duct means.

8. The apparatus as claimed in claim 5 wherein said fluid exit port means further includes a first end and a second end corresponding to the first and second ends of said header duct means and wherein the upper surface portion of said exit port means slopes downwardly from said first end to said second end to reduce the potential head of the fluid flowing through said passageways in proportion to the pressure losses of the fluid flowing through said header duct means.

9. In a falling film evaporator of the type providing for the downward flow of a fluid over the exterior vertical surfaces of an evaporator panel to evaporate the fluid flowing thereover and to condense vapor flowing therein, an improved overflow header apparatus providing uniform fluid flow distribution over the exterior vertical panel surfaces at high flow rates comprising:
   a. a longitudinally extending header duct means for disposition along the top of said evaporator panel, said header duct means having parallel vertical side walls for alignment with the exterior vertical surfaces of said evaporator panel, an open upper edge portion, a bottom wall, and a first and second end;
   b. inlet means communicating with said header duct means at the first end thereof for admitting and directing the flow of fluid longitudinally through said header duct means from the first end to the second end;

c. longitudinally extending fluid exit port means carried by and in fluid flow communication with said header duct means; said fluid exit port means having parallel vertical side walls in alignment with the side walls of said header duct means, a bottom edge portion engaging the open top edge portion of said header duct means, an upper overflow surface, and a first end and a second end corresponding with the first and second ends of said header duct means; said fluid exit port means further having means defining a plurality of vertically extending open ended passageways communicating with said header duct means and with said upper overflow surface for the vertical upward outflow of fluid therethrough; and d. said header duct means being further adapted to provide decreasing cross sectional flow area from said first end to said second end thereof in proportion to the volume of cumulative vertical upward outflow of fluid along the length of said header duct means from the first end to the second end thereof to provide uniform average fluid flow velocity longitudinally through said header duct means.

10. The apparatus as claimed in claim 9 wherein the vertical extension of the plurality of open-ended passageways in said fluid exit port means decreases in height along said fluid exit port means from said first end to said second end thereof in proportion to the frictional pressure losses of the fluid flowing in said header duct means.

11. The apparatus as claimed in claim 9 wherein the vertical extension of the plurality of open ended passageways in said fluid exit port means decreases in length along said fluid exit port means from said first end to said second end thereof in proportion to the frictional pressure losses of the fluid flowing in said header duct means.

12. The apparatus as claimed in claim 9 wherein the cross sectional area of the plurality of vertically extending passageways increases along said fluid exit port means from said first end to said second end thereof in proportion to the frictional pressure losses of the fluid flowing in said header duct means.

13. The apparatus as claimed in claim 9 wherein said means defining a plurality of open-ended passageways comprises an open-ended cellular structure.

14. The apparatus as claimed in claim 9 wherein said inlet means includes flow director means for longitudinally orienting the flow of fluid admitted into said header duct means.

15. The apparatus as claimed in claim 9 wherein the fluid is a brine solution and wherein said header duct means further includes fluid outlet means in the second end thereof for discharge of excess solid material concentrating in said brine fluid flowing in said header duct means.

* * * * *